(12) United States Patent
Saito

(10) Patent No.: US 6,517,459 B2
(45) Date of Patent: Feb. 11, 2003

(54) SYSTEM AND METHOD OF DETERMINING COMPLETION OF PISTON STROKE IN AUTOMATIC TRANSMISSION

(75) Inventor: Yuji Saito, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/954,019

(22) Filed: Sep. 18, 2001

(65) Prior Publication Data

US 2002/0035000 A1 Mar. 21, 2002

(30) Foreign Application Priority Data

Sep. 18, 2000 (JP) ........................................ 2000-282324

(51) Int. Cl.$^7$ .............................................. F16H 61/08
(52) U.S. Cl. ........................ 475/116; 475/127; 477/143
(58) Field of Search ................................. 475/116, 117, 475/121, 127; 477/143, 154

(56) References Cited

U.S. PATENT DOCUMENTS

| | | | | |
|---|---|---|---|---|
| 5,014,573 A | * | 5/1991 | Hunter et al. ................ | 477/154 |
| 5,113,343 A | * | 5/1992 | Hunter et al. ................ | 477/149 |
| 5,580,332 A | * | 12/1996 | Mitchell et al. ............ | 477/143 |
| 5,743,826 A | * | 4/1998 | Usuki et al. ................ | 477/143 |
| 6,149,548 A | * | 11/2000 | Holbrook et al. ........... | 477/143 |
| 6,254,511 B1 | * | 7/2001 | Esterby et al. .............. | 477/143 |

FOREIGN PATENT DOCUMENTS

JP 4-366063 12/1992

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Saito, filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,298, Saito, filed Sep. 18, 2001.

* cited by examiner

Primary Examiner—Sherry Estremsky
(74) Attorney, Agent, or Firm—Foley & Lardner

(57) ABSTRACT

An automatic transmission includes a low reverse brake and a reverse clutch that are engaged at different timings to determine a selected gear position, the reverse clutch being engaged immediately before the low reverse brake to be engaged last. It is determined whether or not a piston for actuating the reverse clutch has completed its stroke up to the position where it can start actual engagement. Before determination that the piston of the reverse clutch has completed its stroke up to the position where it can start actual engagement, it is prevented to determine whether or not a piston for actuating the low reverse brake has completed its stroke up to the position where it can start actual engagement.

13 Claims, 4 Drawing Sheets

FIG.2

|        | R/C | H/C | L/C | LR/B | L/OWC | 2-4/B |
|--------|-----|-----|-----|------|-------|-------|
| 1st    |     |     |  ◯  | (◯)  |   ◯   |       |
| 2nd    |     |     |  ◯  |      |       |   ◯   |
| 3rd    |     |  ◯  |  ◯  |      |       |       |
| 4th    |     |  ◯  |     |      |       |   ◯   |
| Rev    |  ◯  |     |     |  ◯   |       |       |

FIG.4A
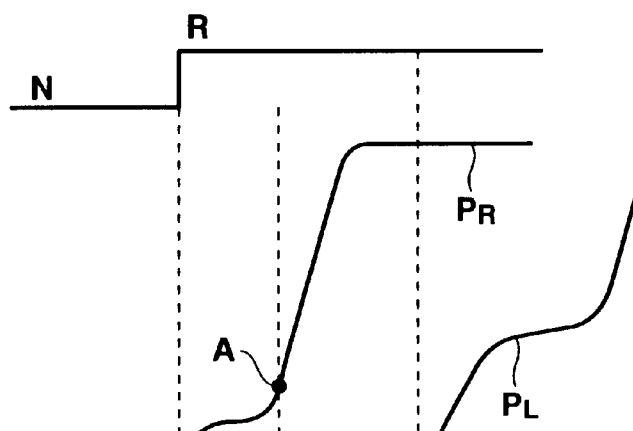
FIG.4B
FIG.4C
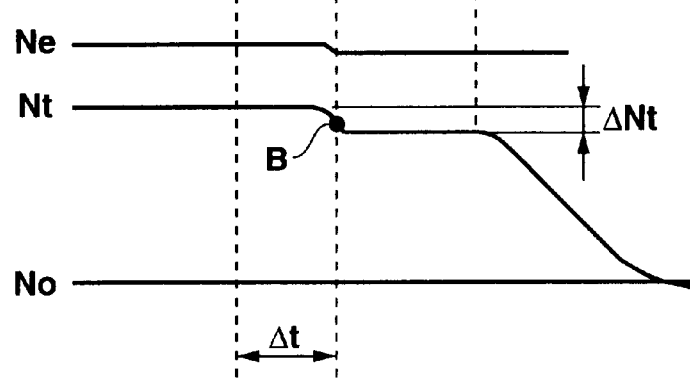

SYSTEM AND METHOD OF DETERMINING COMPLETION OF PISTON STROKE IN AUTOMATIC TRANSMISSION

BACKGROUND OF THE INVENTION

The present invention relates to a system and method of determining completion of a piston stroke in an automatic transmission wherein a selected gear position is determined by engaging at least two of the friction elements at different timings, which determines whether or not a piston for actuating the first friction element to be engaged last has completed its stroke up to the position where it can start actual engagement.

In the automatic transmission, a power transfer route of a gear transmission mechanism or a gear position is determined by selectively hydraulically actuating or engaging friction elements such as clutch and brake. Engine rotation or torque input to the transmission through a torque converter is converted at a ratio responsive to the selected gear position to produce an output. In short, the automatic transmission changes one gear position to another by switching the friction elements to be engaged, achieving out the shift.

When controlling the degree of development of the shift in accordance with the state of the friction elements which ensure the above shift control, the state of the friction elements should be estimated in the way as disclosed in JP-A 4-366063.

Particularly, in the automatic transmission wherein a selected gear position is determined by engaging two friction elements at different timings, the shift is developed in accordance with the first friction element to be engaged last. Thus, in order to achieve a good shift shock, it s necessary to determine whether or not a piston for actuating the first friction element has completed its stroke up to the position where it can start actual engagement.

However, in the automatic transmission wherein a selected gear position is determined by engaging two friction elements at different timings, a turbine revolution corresponding to a transmission input revolution produces fine variations at engagement of the second friction element occurring immediately before engagement of the first friction element. This can lead to erroneous detection that the piston for actuating the first friction element has completed its stroke up to the position where it can start actual engagement. The occurrence of this problem in the transmission is remarkable at a low oil temperature where a drag produced at engagement of the friction elements is apt to be greater.

SUMMARY OF THE INVENTION

It is, therefore, an object of the present invention to provide a system and method of determining completion of a piston stroke in an automatic transmission wherein a selected gear position is determined by engaging at least two of the friction elements at different timings, which can appropriately determine completion of the stroke of a piston for actuating the first friction element to be engaged last has completed its stroke up to the position where it can start actual engagement.

The present invention generally provides an automatic transmission, comprising:

a plurality of friction elements with respective pistons, at least first and second friction elements being engaged at different timings to determine a selected gear position, the second friction element being engaged immediately before the first friction element to be engaged last; and a controller that controls the friction elements, wherein the controller determines whether or not the second piston for actuating the second friction element has completed its stroke up to a second predetermined position where the second piston can start actual engagement, and wherein before determination that the second piston has completed its stroke up to the second predetermined position, the controller fails to determine whether or not the first piston for actuating the first friction element has completed its stroke up to a first predetermined position where the first piston can start actual engagement.

One aspect of the present invention is to provide a method of controlling an automatic transmission with a plurality of friction elements with respective pistons, at least first and second friction elements being engaged at different timings to determine a selected gear position, the second friction element being engaged immediately before the first friction element to be engaged last, the method comprising:

determining whether or not the second piston for actuating the second friction element has completed its stroke up to a second predetermined position where the second piston can start actual engagement; and preventing, before determination that the second piston has completed its stroke up to the second predetermined position, determination whether or not the first piston for actuating the first friction element has completed its stroke up to a first predetermined position where the first piston can start actual engagement.

Another aspect of the present invention is to provide a system for controlling an automatic transmission with a plurality of friction elements with respective pistons, at least first and second friction elements being engaged at different timings to determine a selected gear position, the second friction element being engaged immediately before the first friction element to be engaged last, the system comprising:

means for determining whether or not the second piston for actuating the second friction element has completed its stroke up to a second predetermined position where the second piston can start actual engagement; and means for preventing, before determination that the second piston has completed its stroke up to the second predetermined position, determination whether or not the first piston for actuating the first friction element has completed its stroke up to a first predetermined position where the first piston can start actual engagement.

BRIEF DESCRIPTION OF THE DRAWINGS

The other objects and features of the present invention become apparent from the following description with reference to the drawings wherein:

FIG. 2 is a table illustrating the relationship between each selected gear position and the engagement logic of friction elements in an automatic transmission;

FIGS. 4A–4C are time charts illustrating time-series variations in parameters when the friction elements for reverse drive is engaged with N-R shift selected, wherein FIG. 4A shows a signal indicative of a selected range, FIG. 4B shows oil pressures $P_R$, $P_L$ supplied to a reverse clutch R/C and a low reverse brake LR/B, respectively, and FIG. 4C shows an engine rpm Ne, a turbine rpm Nt, and a transmission output rpm No.

DETAILED DESCRIPTION OF THE INVENTION

Figure 1:
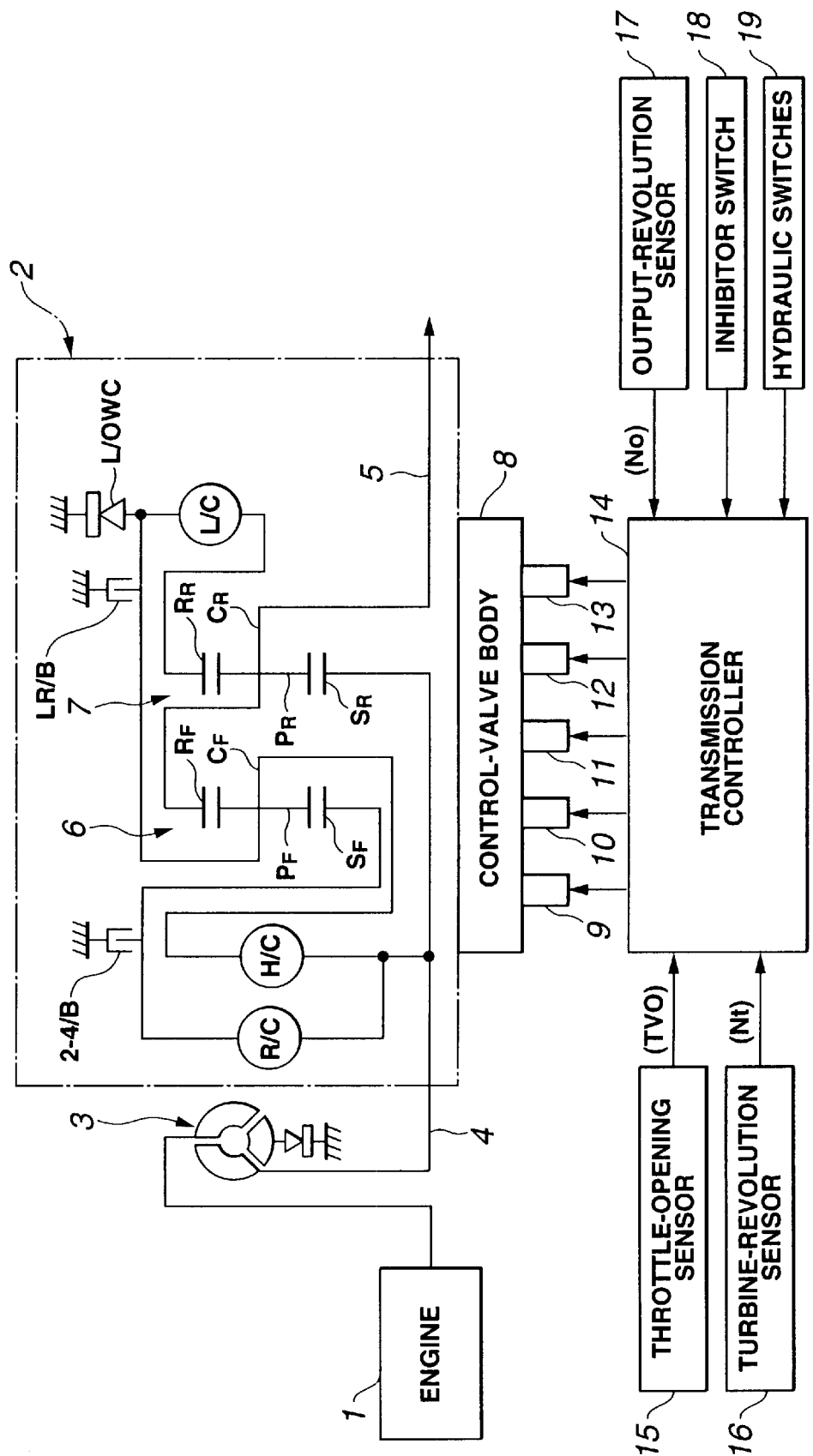
FIG. 1 is a block diagram showing a power train of a motor vehicle with a shift control system, to which the present invention is applied.

Referring to the drawings, a description will be made with regard to a system and method of determining completion of a piston stroke in an automatic transmission, which embodies the present invention.

Referring to FIG. 1, an engine 1 produces an output controlled by a throttle valve that varies from a fully closed position to a fully open position in accordance with depression of an accelerator pedal operated by a driver. Output rotation of the engine 1 is provided to an input shaft 4 of an automatic transmission 2 through a torque converter 3.

The automatic transmission 2 comprises input and output shafts 4, coaxially butt-disposed, and front and rear planetary-gear sets 6, 7 mounted thereon in this order from the engine 1, which form main components of a planetary-gear transmission mechanism of the automatic transmission 2.

The front planetary-gear set 6 close to the engine 1 is a simple planetary-gear set comprising a front sun gear $S_F$, a front ring gear $R_F$, a front pinion $P_F$ meshed with the two, and a front carrier $C_F$ for rotatably supporting the front pinion.

Likewise, the rear planetary-gear set 7 distant from the engine 1 is a simple planetary-gear set comprising a rear sun gear $S_R$, a rear ring gear $R_R$, a rear pinion $P_R$ meshed with the two, and a rear carrier $C_R$ for rotatably supporting the rear pinion.

Friction elements for determining a transfer route or gear position of the planetary-gear transmission mechanism are a low clutch L/C, a second/fourth-gear brake 2-4/B, a high clutch H/C, a low reverse brake LR/B, a low one-way clutch L/OWC, and a reverse clutch R/C, which are arranged in correlation to the components of the planetary-gear sets 6, 7.

Specifically, the front sun gear $S_F$ can be coupled with the input shaft 4 by the reverse clutch R/C as required, and be put stationary by the second/fourth-gear brake 2-4/B as required.

The front carrier $C_F$ can be coupled with the high clutch H/C as required. Moreover, the front carrier $C_F$ is prevented from having reverse rotation to engine rotation by the low one-way clutch L/OWC, and can be put stationary by the low reverse brake LR/B as required.

The front carrier $C_F$ and the rear ring gear $R_R$ can be coupled with each other by the low clutch L/C as required.

The front ring gear $R_F$ and the rear carrier $C_R$ are coupled with each other and with the output shaft 6, and the rear sun gear $S_R$ is coupled with the input shaft 4.

Figure 2:
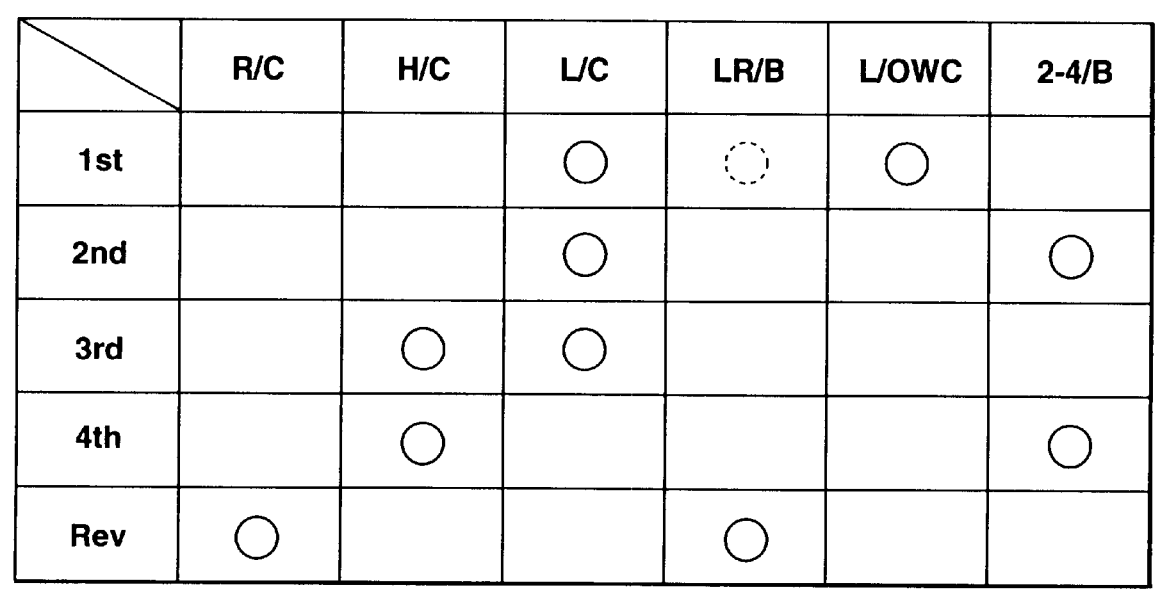

Referring to FIG. 2, a power train of the planetary-gear transmission mechanism can achieve four forward gear positions including forward first, second, third, and fourth gear positions $1^{st}$, $2^{nd}$, $3^{rd}$, $4^{th}$, and one reverse gear position Rev by selective hydraulic actuation or engagement of the friction elements L/C, 2-4/B, H/C, LR/B, R/C given by solid-line circle and self-engagement of the low one-way clutch L/OWC given by solid-line circle. Hydraulic actuation or engagement of the friction element LR/B given by broken-line circle is carried out when engine brake is needed.

Referring to FIGS. 1–2, the engagement logic of the friction elements L/C, 2-4/B, H/C, LR/B, R/C is realized by a control-valve body 8 having, in addition to a manual valve, not shown, a line-pressure solenoid 9, a low-clutch solenoid 10, a second/fourth-gear-brake solenoid 11, a high-clutch solenoid 12, a low-reverse-brake solenoid 13, etc. mounted thereto.

The line-pressure solenoid 9 is operated in an ON-OFF way to switch between high and low levels the line pressure as source pressure for shift control. The unillustrated manual valve is operated to a forward-drive (D) range position, a reverse-drive (R) range position or a parking or neutral (P or N) range position.

In the D range position, the manual valve supplies the line pressure to a predetermined circuit by duty control of the low-clutch solenoid 10, the second/fourth-gear-brake solenoid 11, the high-clutch solenoid 12, and the low-reverse-brake solenoid 13 through the line pressure so as to allow individual control of the working oil pressures for the corresponding low clutch L/C, second/fourth-gear brake 2-4/B, high clutch H/C, and low reverse brake LR/B. Duty control of each solenoid allows achievement of the engagement logic of the first to fourth gear positions as shown in FIG. 2.

In the R range position, the manual valve directly supplies the line pressure to the reverse clutch R/C for engagement thereof, and ensures duty control of the low-reverse-brake solenoid 13 to control the working oil pressure for the low reverse brake LR/B in a time-series way for engagement thereof, which allows achievement of the engagement logic of the reverse gear position as shown in FIG. 2.

In the P and N range positions, the manual valve does not supply the line pressure to any circuit to put all friction elements in the released state, obtaining the neutral state of the automatic transmission.

Referring to FIG. 1, a transmission controller 14 carries out ON-OFF control of the line-pressure solenoid 9 and duty control of the low-clutch solenoid 10, the second/fourth-gear-brake solenoid 11, the high-clutch solenoid 12, and the low-reverse-brake solenoid 13. The transmission controller 14 receives a signal out of a throttle-opening sensor 15 for sensing a throttle opening degree TVO of the engine 1, a signal out of a turbine-revolution sensor 16 for sensing a turbine rpm Nt that corresponds to an output rpm of the torque converter 3 or transmission input rpm, a signal out of an output-revolution sensor 17 for sensing an rpm No of the output shaft 5 of the automatic transmission 2, and a signal out of an inhibitor switch 18 for detecting a selected range.

Automatic shift operation in the D range will be described. The transmission controller 14 carries out a control program, not shown, to search, in accordance with the throttle opening degree TVO and the transmission output rpm No or vehicle velocity, a predetermined shift map responsive to an input signal out of the inhibitor switch 18 for a preferable gear position required in actual drive conditions.

Then, the transmission controller 14 is determined whether or not an actually selected gear position corresponds to the preferable gear position. If the actually selected gear position fails to correspond to the preferable gear position, the controller 14 produces a shift command to alter the working oil pressure for the friction elements for the shift through duty control of the solenoids 10–13, allowing the shift to the preferable gear position, i.e. carrying out switching between engagement and release of the friction elements in accordance with the table of engagement logic in FIG. 2.

Figure 3:
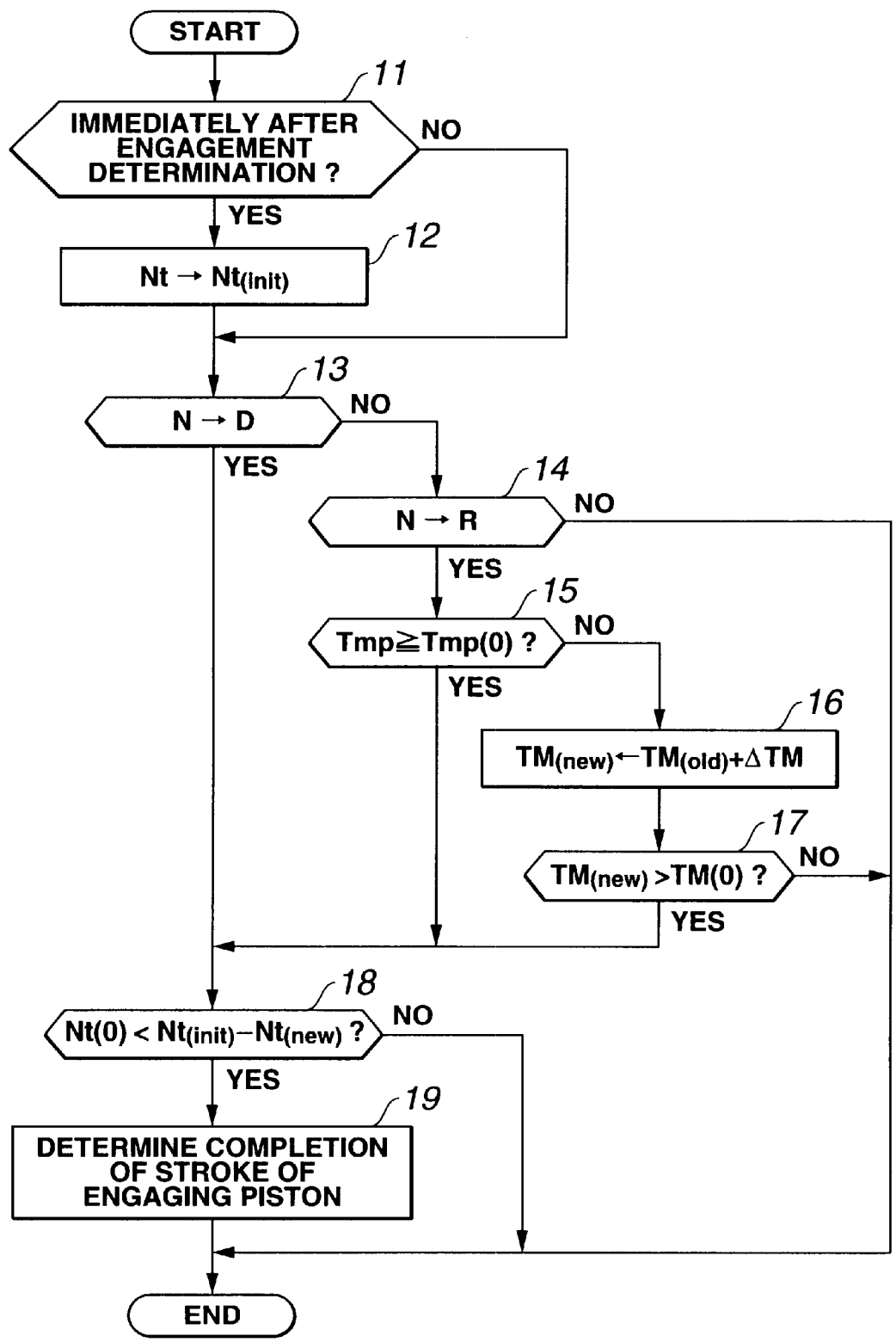
FIG. 3 is a flowchart showing operation of an embodiment of the present invention.

Referring to FIGS. 3–4, operation of the system and method of determining completion of a piston stroke will be described in detail.

A control flow shown in FIG. 3 is repeatedly executed in the transmission controller 14 every preset time in accordance with a control cycle. The N-R shift by means of switching from the N range position to the R range position is achieved by engaging two friction elements or the low reverse brake LR/B and the reverse clutch R/C at different timings. The N-D shift by means of switching from the N range position to the D range position is achieved by engaging a single friction element.

In this embodiment, the N-R shift is carried out with the low reverse brake LR/B serving as a first friction element to be engaged last and the reverse clutch R/C serving as a second friction element to be engaged immediately before the low reverse brake LR/B. Optionally, in another embodiment, the reverse clutch R/C may serve as a first friction element, and the low reverse brake LR/B may serve as a second friction element.

Referring to FIG. 3, at a step 11, it is determined whether or not control is immediately after engagement determination or gear-position switching determination for proceeding to the shift. At the step 11, if it is determined that control is immediately after gear-position switching determination, control proceeds to a step 12 as the shift operation will start actually. At the step 12, the turbine rpm $Nt_{(init)}$ before shift startup is set, then control proceeds to a step 13. On the other hand, at the step 11, if the shift operation is already in continuation, it is determined that control is not immediately after gear-position switching determination, and control directly proceeds to a step 13.

At the step 13, it is determined whether or not the actual shift is N-D shift by means of switching from the N range position to the D range position. At the step 13, if it is determined that the actual shift is N-D shift, control directly proceeds to a step 18 as the N-D shift is completed by engagement of a single friction element, and thus the conditions are not unfavorable to determine whether or not a piston for actuating this friction element has completed its stroke up to the position where it can start actual engagement based on the same technical idea as the conventional one. On the other hand, at the step 13, if it is determined that the actual shift is not N-D shift, control proceeds to a step 14.

At the step 14, it is determined whether or not the actual shift is N-R shift by means of switching from the N range position to the R range position. At the step 14, if it is determined that the actual shift is not N-R shift, control comes to an end as no shift is needed. On the other hand, at the step 14, if it is determined that the actual shift is N-R shift where the reverse clutch R/C and the low reverse brake LR/B are engaged at different timings, control proceeds to a step 15.

At the step 15, an oil temperature Tmp in the automatic transmission 2 is detected to determine whether or not the detected oil temperature Tmp is equal to or greater than a predetermined oil temperature Tmp(0). At the step 15, if it is determined that Tmp≧Tmp(0), control directly proceeds to the step 18 as the temperature conditions are not unfavorable to directly determine whether or not a piston for actuating the low reverse brake LR/B has completed its stroke up to the position where it can start actual engagement. Specifically, when Tmp≧Tmp(0), it is determined whether or not the piston of the low reverse brake LR/B has completed its stroke up to the position where it can start actual engagement, without determining whether or not a piston of the reverse clutch R/C has completed its stroke up to the position where it can start actual engagement.

By this, excluding the temperature condition where greater drag is apt to occur at engagement of the friction elements, it is possible to determine whether or not the piston of the reverse clutch R/C has completed its stroke up to the position where it can start actual engagement. This allows more reliable elimination of an influence of a drag or the like produced at another friction element before the piston of the reverse clutch R/C completes its stroke up to the position where it can start actual engagement.

Specifically, when Tmp≧Tmp(0), it is determined whether or not the piston of the low reverse brake LR/B has completed its stroke up to the position where it can start actual engagement, i.e. the same determination control as the conventional one is carried out. This facilitates determination whether or not the piston of the low reverse brake LR/B has completed its stroke up to the position where it can start actual engagement. If the predetermined value Tmp(0) is set to a higher value, a drag of the friction element to be produced in a higher oil temperature range can be removed.

That is, with variations in turbine rpm Nt produced by engagement of the reverse clutch R/C, erroneous determination that the piston of the low reverse brake LR/B has completed its stroke up to the position where it can start actual engagement occurs at a low oil temperature with high frequency. Therefore, only when the oil temperature is low, control at steps 16 and 17 is carried out, while when it is greater than an ambient temperature where no erroneous determination will occur, the same control as the conventional one can be carried out.

Therefore, excluding the temperature condition where greater drag is apt to occur at engagement of the friction elements, it is possible to determine completion of the piston stroke for the low reverse brake LR/B, resulting in more reliable determination whether or not the piston of the low reverse brake LR/B has completed its stroke up to the position where it can start actual engagement.

On the other hand, at the step 15, if it is determined that the oil temperature Tmp is not equal to or greater than the predetermined value Tmp(0), control proceeds to a step 16 as the temperature conditions are unfavorable to directly determine whether or not the piston for actuating the low reverse brake LR/B has completed its stroke up to the position where it can start actual engagement.

At the step 16, a timer count value $TM_{(old)}$ or precedent job time is incremented by ΔTM to obtain an updated new timer count value $TM_{(new)}$. At a subsequent step 17, it is determined whether or not the new timer count value $TM_{(new)}$ exceeds a predetermined timer count value TM(0).

At the step 17, if it is determined that the timer count value $TM_{(new)}$ does not exceed the predetermined value TM(0), it is considered that a time measured by a timer does not exceed a predetermined time ΔT, so that determination is made that the piston for actuating the reverse clutch R/C has not completed its stroke up to the position where it can start actual engagement. As a consequence, control comes to an end as the conditions are unfavorable to determine whether or not the piston for actuating the low reverse brake LR/B has completed its stroke up to the position where it can start actual engagement.

On the other hand, at the step 17, if it is determined that $TM_{(new)}$ >TM(0), it is considered that a time measured by the timer exceeds the predetermined time ΔT, so that determination is made that the piston for actuating the reverse clutch R/C has completed its stroke up to the position where it can start actual engagement. As a consequence, control proceeds to the step 18 as the conditions are not unfavorable to determine whether or not the piston for actuating the low reverse brake LR/B has completed its stroke up to the position where it can start actual engagement.

At the step 18, in order to determine whether or not the piston for actuating the low reverse brake LR/B has completed its stroke up to the position where it can start actual engagement, an actual turbine rpm $Nt_{(new)}$ is detected to determine whether or not a difference $\Delta Nt$ between a turbine rpm $Nt_{(init)}$ before shift startup and the actual turbine rpm $Nt_{(new)}$ is greater than a predetermined rpm $Nt(0)$. At the step 18, if it is determined that the difference $\Delta Nt$ ($=Nt_{(init)}-Nt_{(new)}$) is not greater than the predetermined rpm $Nt(0)$, it is considered that the low reverse brake LR/B has not completed its stroke up to the position where it can start actual engagement, and control comes to an end. On the other hand, at the step 18, if it is determined that $Nt(0)<Nt_{(init)}-Nt_{(new)}$, control proceeds to a step 19 where it is determined that the low reverse brake LR/B has completed its stroke up to the position where it can start actual engagement.

According to this control flow, it is determined whether or not the piston for actuating the reverse clutch R/C to be engaged immediately before the low reverse brake LR/B has completed its stroke up to the position where it can start actual engagement. Before determination that the piston of the reverse clutch R/C has completed its stroke up to the position where it can start actual engagement, it is prevented to determine whether or not the piston of the low reverse brake LR/B has completed its stroke up to the position where it can start actual engagement. As a consequence, it is possible to determine whether or not the piston for actuating the low reverse brake LR/B has completed its stroke up to the position where it can start actual engagement, without any influence of a drag or the like produced at another friction element before the piston of the reverse clutch R/C completes its stroke up to the position where it can start actual engagement.

Therefore, in the illustrative embodiment, erroneous determination can be prevented that the piston stroke has been completed in the low reverse brake LR/B due to an influence of a drag or the like, resulting in correct determination of completion of the piston stroke for the low reverse brake LR/B.

Particularly, in the illustrative embodiment, when a time measured by the timer exceeds the predetermined time $\Delta T$, it is determined that the piston of the reverse clutch R/C has completed its stroke up to the position where it can start actual engagement, resulting in more reliable achievement of the effect of the present invention.

In the illustrative embodiment, at the steps 16 and 17, when a time measured based on a timer count value TM exceeds the predetermined time $\Delta T$, it is determined that the piston of the reverse clutch R/C has completed its stroke up to the position where it can start actual engagement. Instead of relying on measurement of the predetermined time $\Delta T$ by the timer, determination may be carried out based on any detection that the piston of the reverse clutch R/C has surely completed its stroke up to the position where it can start actual engagement, and the piston of the low reverse brake LR/B has not completed its stroke up to the position where it can start actual engagement.

Therefore, in another embodiment, control at the steps 16 and 17 may be carded out with means for detecting the oil pressure arranged at the reverse clutch R/C, wherein when a working oil pressure $P_R$ detected by the oil-pressure detecting means reaches a predetermined value $P_R(0)$, it is determined that the piston of the reverse clutch R/C has completed its stroke up to the position where it can start actual engagement. Another embodiment can ensure more reliable achievement of the effect of the present invention in the same way as the embodiment wherein timer measurement is carried out. The oil-pressure detecting means may be, e.g., in the form of an oil-pressure sensor, an oil-pressure switch or the like. The working oil pressure $P_R$ can be detected directly by the oil-pressure sensor, or indirectly through ON-OFF of the oil-pressure switch.

In still another embodiment, control at the steps 16 and 17 may be carried out with means for detecting a stroke amount of the piston for actuating the reverse clutch R/C, wherein when the stroke amount detected by the stroke-amount detecting means reaches a predetermined value, it is determined that the piston of the reverse clutch R/C has completed its stroke up to the position where it can start actual engagement. Still another embodiment can ensure more reliable achievement of the effect of the present invention in the same way as the embodiment wherein timer measurement is carried out. The stroke-amount detecting means may be, e.g., in the form of a stroke sensor. The piston-stroke amount can be detected directly by the stroke sensor, or indirectly by an ON-OFF switch.

In further embodiment, control at the steps 16 and 17 may be carried out with means for detecting a quantity of state indicative of variations in the transmission input rpm or the turbine rpm Nt produced by engagement of the reverse clutch R/C, wherein when the quantity of state is detected, it is determined that the piston of the reverse clutch R/C has completed its stroke up to the position where it can start actual engagement. In further embodiment, completion of the stroke of the piston of the reverse clutch R/C up to the position where it can start actual engagement can be determined based on existing information, resulting in more reliable achievement of the effect of the present invention. The quantity of state indicative of variations in the turbine rpm Nt includes a rate of change of the turbine rpm Nt or a transmission input torque, i.e. a rate of change of a turbine torque Tt or a velocity ratio $e_t$ of the torque converter 3.

FIGS. 4A–AC show time charts when executing the control flow as shown in FIG. 3, wherein FIG. 4A shows a signal indicative of a selected range, FIG. 4B shows oil pressures $P_R$, $P_L$ supplied to the reverse clutch R/C and the low reverse brake LR/B, respectively, and FIG. 4C shows engine rpm Ne, turbine rpm Nt, and transmission output rpm No.

Referring to FIGS. 4A–AC, the predetermined time $\Delta t$ is counted by the timer to determine whether or not the piston of the reverse clutch R/C to be engaged immediately before the low reverse brake LR/B to be engaged last has completed its stroke up to the position where it can start actual engagement. As seen from the time charts, this surely eliminates an influence of a drag or the like produced at another friction element before the piston of the reverse clutch R/C completes its stroke up to the position where it can start actual engagement, i.e. an influence of a $\Delta Nt$ reduction in the turbine rpm Nt due to sudden engagement of the reverse clutch R/C.

In another embodiment, there are arranged oil-pressure detecting means at the reverse clutch R/C. A working oil pressure $P_L$ of the reverse clutch R/C is detected at reference A in FIG. 4B to determine that the piston of the reverse clutch R/C to be engaged immediately before the low reverse brake LR/B to be engaged last has completed its stroke up to the position where it can start actual engagement. And it is determined whether or not the piston of the low reverse brake LR/B has completed its stroke up to the position where it can start actual engagement.

In still another embodiment, there are arranged means for detecting the stroke amount of the piston for actuating the reverse clutch R/C. The piston-stroke amount is detected at reference A in FIG. 4B to determine that the piston of the reverse clutch R/C to be engaged immediately before the low reverse brake LR/B to be engaged last has completed its stroke up to the position where it can start actual engagement. And it is determined whether or not the piston of the low reverse brake LR/B has completed its stroke up to the position where it can start actual engagement.

In further embodiment, there are arranged means for detecting a quantity of state indicative of variations in the turbine rpm Nt produced by engagement of the reverse clutch R/C. The quantity of state is detected at reference B in FIG. 4C to determine that the piston of the reverse clutch R/C to be engaged immediately before the low reverse brake LR/B to be engaged last has completed its stroke up to the position where it can start actual engagement. And it is determined whether or not the piston of the low reverse brake LR/B has completed its stroke up to the position where it can start actual engagement.

Having described the present invention in connection with the preferred embodiments, it is noted that the present invention is not limited thereto, and a person skilled in the art could make various changes and modifications without departing from the scope of the present invention. By way of example, for briefly explaining operation of the embodiment, the flowchart in FIG. 3 assumes that the shift by means of switching from the N range position to the D range position is achieved by engagement of a single friction element. Alternatively, the flowchart can be modified wherein the D range position is divided into forward first to fourth gear positions $1^{st}, 2^{nd}, 3^{rd}, 4^{th}$ as shown in FIG. 2, and the shift is carried out by engaging two friction elements at different timings in the same way as the N-R shift.

The entire teachings of Japanese Patent Application P2000-282324 are incorporated hereby by reference.

What is claimed is:

1. An automatic transmission, comprising:
a plurality of friction elements with respective pistons, at least first and second friction elements being engaged at different timings to determine a selected gear position, the second friction element being engaged immediately before the first friction element to be engaged last; and
a controller that controls the friction elements,
wherein the controller determines whether or not the second piston for actuating the second friction element has completed its stroke up to a second predetermined position where the second piston can start actual engagement, and
wherein before determination that the second piston has completed its stroke up to the second predetermined position, the controller fails to determine whether or not the first piston for actuating the first friction element has completed its stroke up to a first predetermined position where the first piston can start actual engagement.

2. The automatic transmission as claimed in claim 1, wherein determination whether or not the second piston has completed its stroke up to the second predetermined position is carried out with a timer, wherein determination is made when a time measured by the timer exceeds a predetermined time.

3. The automatic transmission as claimed in claim 1, wherein determination whether or not the second piston has completed its stroke up to the second predetermined position is carried with means for detecting an oil pressure arranged at the second friction element, wherein determination is made when the oil pressure detected by the oil-pressure detecting means reaches a predetermined value.

4. The automatic transmission as claimed in claim 1, wherein determination whether or not the second piston has completed its stroke up to the second predetermined position is carried with means for detecting a stroke amount of the second piston, wherein determination is made when the stroke amount detected by the stroke-amount detecting means reaches a predetermined value.

5. The automatic transmission as claimed in claim 1, wherein determination whether or not the second piston has completed its stroke up to the second predetermined position is carried with means for detecting a quantity of state indicative of variations in a transmission input rpm produced by engagement of the second friction element, wherein determination is made when the quantity of state is detected by the quantity detecting means.

6. The automatic transmission as claimed in claim 1, wherein when a detected oil temperature in the transmission is equal to or greater than a predetermined value, the controller determines whether or not the first piston has completed its stroke up to the first predetermined position without determining whether or not the second piston has completed its strike up to the second predetermined position.

7. A method of controlling an automatic transmission with a plurality of friction elements with respective pistons, at least first and second friction elements being engaged at different timings to determine a selected gear position, the second friction element being engaged immediately before the first friction element to be engaged last, the method comprising:
determining whether or not the second piston for actuating the second friction element has completed its stroke up to a second predetermined position where the second piston can start actual engagement; and
preventing, before determination that the second piston has completed its stroke up to the second predetermined position, determination whether or not the first piston for actuating the first friction element has completed its stroke up to a first predetermined position where the first piston can start actual engagement.

8. The method as claimed in claim 7, wherein determining whether or not the second piston has completed its stroke up to the second predetermined position is carried out with a timer, wherein determination is made when a time measured by the timer exceeds a predetermined time.

9. The method as claimed in claim 7, wherein determining whether or not the second piston has completed its stroke up to the second predetermined position is carried with means for detecting an oil pressure arranged at the second friction element, wherein determination is made when the oil pressure detected by the oil-pressure detecting means reaches a predetermined value.

10. The method as claimed in claim 7, wherein determining whether or not the second piston has completed its stroke up to the second predetermined position is carried with means for detecting a stroke amount of the second piston, wherein determination is made when the stroke amount detected by the stroke-amount detecting means reaches a predetermined value.

11. The method as claimed in claim 7, wherein determining whether or not the second piston has completed its stroke up to the second predetermined position is carried with means for detecting a quantity of state indicative of variations in a transmission input rpm produced by engagement of the second friction element stroke amount of the second piston, wherein determination is made when the quantity of state is detected by the quantity detecting means.

12. The method as claimed in claim 7, wherein when a detected oil temperature in the transmission is equal to or greater than a predetermined value, it is determined whether or not the first piston has completed its stroke up to the first predetermined position without determining whether or not the second piston has completed its strike up to the second predetermined position.

13. A system for controlling an automatic transmission with a plurality of friction elements with respective pistons, at least first and second friction elements being engaged at different timings to determine a selected gear position, the second friction element being engaged immediately before the first friction element to be engaged last, the system comprising:

means for determining whether or not the second piston for actuating the second friction element has completed its stroke up to a second predetermined position where the second piston can start actual engagement; and means for preventing, before determination that the second piston has completed its stroke up to the second predetermined position, determination whether or not the first piston for actuating the first friction element has completed its stroke up to a first predetermined position where the first piston can start actual engagement.

* * * * *